Oct. 7, 1969 G. KAPS 3,471,790

DEVICE FOR SYNCHRONIZING PULSES

Filed April 13, 1966 3 Sheets-Sheet 1

INVENTOR.
GERHARD KAPS

BY
Frank R. [signature]
AGENT

| | | | | FF1 | | FF2 | | |
|---|---|---|---|---|---|---|---|---|
| t | e | $s_1$ | $s_2$ | $s_3$ | $s_4$ | $s_5$ | $s_6$ | a |
| $t_0$ | 0 | 1 | 0 | 1 | 0 | 1 | 0 | 0 |
| | 1 | 0 | 1 | 1 | 0 | 1 | 0 | 0 |
| $t_1$ | 1 | 0 | 1 | 0 | 1 | 1 | 0 | 0 |
| | 1 | 0 | 1 | 0 | 1 | 1 | 0 | 0 |
| $t_2$ | 1 | 0 | 1 | 0 | 1 | 0 | 1 | 0 |
| | 1 | 0 | 1 | 0 | 1 | 0 | 1 | 0 |
| $t_3$ | 1 | 0 | 1 | 0 | 1 | 0 | 1 | 0 |
| | 0 | 1 | 0 | 0 | 1 | 0 | 1 | 0 |
| $t_4$ | 0 | 1 | 0 | 1 | 0 | 0 | 1 | 1 |
| | 0 | 1 | 0 | 1 | 0 | 0 | 1 | 1 |
| $t_5$ | 0 | 1 | 0 | 1 | 0 | 1 | 0 | 0 |

FIG.2

INVENTOR.
GERHARD KAPS
BY
Frank R. Trifari
AGENT

| | | | D | | | | | | |
|---|---|---|---|---|---|---|---|---|---|
| t | e | ē | $s_1$ | $s_2$ | $s_3$ | $s_4$ | $s_5$ | $s_6$ | a |
| $t_0$ | 0 | 1 | 0 | 0 | 0 | 0 | 0 | 1 | 0 |
| | 1 | 0 | 0 | 1 | 0 | 0 | 0 | 1 | 0 |
| $t_1$ | 1 | 0 | 0 | 1 | 0 | 0 | 1 | 0 | 0 |
| | 1 | 0 | 0 | 1 | 0 | 0 | 1 | 0 | 0 |
| $t_2$ | 1 | 0 | 0 | 1 | 0 | 0 | 1 | 0 | 0 |
| | 1 | 0 | 0 | 1 | 0 | 0 | 1 | 0 | 0 |
| $t_3$ | 1 | 0 | 0 | 1 | 0 | 0 | 1 | 0 | 0 |
| | 0 | 1 | 1 | 0 | 0 | 0 | 1 | 0 | 0 |
| $t_4$ | 0 | 1 | 1 | 0 | 0 | 1 | 0 | 0 | 1 |
| | 0 | 1 | 0 | 0 | 1 | 1 | 0 | 0 | 1 |
| $t_5$ | 0 | 1 | 0 | 0 | 1 | 0 | 0 | 1 | 0 |
| | 0 | 1 | 0 | 0 | 0 | 0 | 0 | 1 | 0 |
| $t_6$ | 0 | 1 | 0 | 0 | 0 | 0 | 0 | 1 | 0 |

FIG. 4

INVENTOR.
GERHARD KAPS
BY
Frank R. Trifari
AGENT

1

3,471,790

DEVICE FOR SYNCHRONIZING PULSES

Gerhard Kaps, Hamburg-Lokstedt, Germany, assignor, by mesne assignments, to U.S. Philips Corporation, New York, N.Y., a corporation of Delaware Filed Apr. 13, 1966, Ser. No. 542,312
Claims priority, application Germany, Apr. 23, 1965, P 36,595
Int. Cl. H03k *3/04, 17/28*
U.S. Cl. 328—63 2 Claims

ABSTRACT OF THE DISCLOSURE

This invention converts pulses of arbitrary duration and starting times into pulses of constant duration and starting time as determined by a clock pulse generator. This is achieved by having a tristable memory element run from the clock. The element has three inputs and outputs, where two of the outputs are coupled to the inputs, directly and indirectly through an input AND gate respectively. The circuit therefore has two stable and one unstable state. The first state is a rest state, the second is entered when a pulse is received, the third when the pulse ceases, but since it is unstable the circuit returns to the first state.

The invention relates to a device for converting pulses of any arbitrary duration, occurring at arbitrary instants, into pulses of constant duration, occurring at instants determined by a clock pulse generator. Such an arrangement may be employed anywhere for counting pulses appearing at arbitrary instants, frequently of variable duration. The counting circuitry proper, indeed, may be considerably simplified, when the pulses to be counted are converted into pulses having an accurately defined duration, and occurring at instants determined by a clock pulse generator. However, conventional circuits for this purpose comprise a fairly great quantity of material and the invention has mainly for its object to provide a device which requires less material than the known arrangements of this type.

According to the invention this is achieved by providing the device with a synchronous tristable circuit having three input terminals and three output terminals, responding to the reception of a clock pulse by transmitting a tetravalent signal received at the input to the output, when the input signal is (100), (010) or (001), while the circuit does not change the signal appearing at its output when the input signal is (000), so that the output signal is trivalent, said circuit being fed back in such a manner that in the rest position of the device the tristable circuit is in a first stable state, that it responds to the reception of a pulse by changing over to a second stable state at the next-following clock pulse instant, in which state it remains as long as said pulse lasts, whereas the circuit responds to the disappearance of said pulse by changing back to its first stable state through the third stable state and supplies an output signal of the value "1" as long as the tristable circuit is in the third stable state.

The invention will be described more fully with reference to one embodiment shown in the drawing.

FIG. 2 shows a table for explaining the operation of said device.

FIG. 4 shows a table for explaining its operation.

Figure 1:
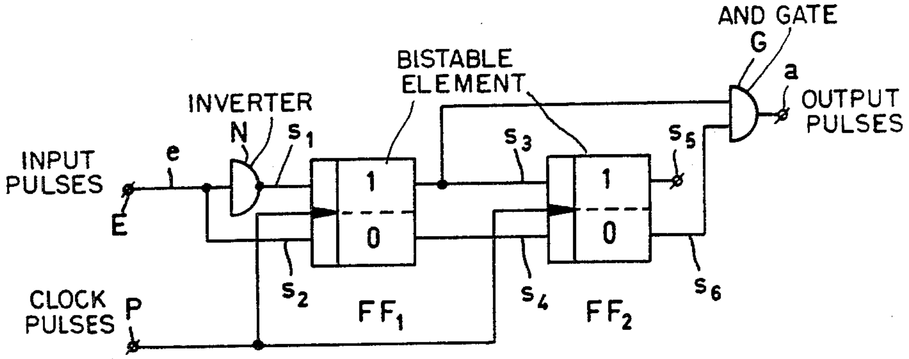
FIG.1 PRIOR ART
FIG. 1 shows the circuit diagram of a known device for the purpose referred to above, comprising two synchronous flip-flops.

Referring to FIG. 1, references $FF_1$ and $FF_2$ designate

2 two synchronous flipflops, N a negator or NON-gate and G an AND-gate; E is an input terminal for the pulses to be counted and P is an input terminal for the clock pulses. The signals appearing in the circuitry are designated by $e$, $s_1$, $s_2$, $s_3$, $s_4$, $s_5$ and $s_6$. The AND-gate G supplies the output signal $a$.

A synchronous flipflop is to be understood to mean herein an arrangement which receives an input signal of one bit (the combination $s_1$, $s_2$ for $FF_1$ and the combination $s_3$, $s_4$ for $FF_2$) and supplies an output signal of one bit (the combination $s_3$, $s_4$ for $FF_1$ and the combination $s_5$, $s_6$ for $FF_2$). Such a flipflop transmits the value of its input signal to the output only at the instants of reception of a clock pulse. Variations of the input signal in the interval between two clock pulses are therefore not transmitted to the output. This is only the case for the value of the input signal at the instant of a clock pulse. Such flipflops are described inter alia in the book of G. A. Maley and J. Earle: "The Logic Design of Transistor Digital Computers."

Since the two signals $s_1$ and $s_2$ form together a (compound) signal of one bit, only the combinations $s_1$="1," $s_2$="0" and $s_1$="0," $s_2$="1" can occur. Similarly for the signal pairs $s_3$, $s_4$ and $s_5$, $s_6$.

From FIG. 1 it appears that the output signal $a$ has the value 1 only when $s_3$=$s_6$="1," that is to say when the flipflop $FF_1$ is in the state 1 and the flipflop $FF_2$ is in the state 0. It is found that this is invariably the case after a counting pulse has ended, irrespectively of the duration thereof, provided this duration is not shorter than the time interval between two consecutive clock pulses. This is obvious from the table of FIG. 2. At the clock instant $t_0$ no pulse is received ($e$="0," hence $s_1$="1," $s_2$="0"), and the flipflops $FF_1$ and $FF_2$ are both in the state 1 ($s_3$="1," $s_4$="0" and $s_5$="1," $s_6$="0"), so that also $a$="0."

Suppose that between the instants $t_0$ and $t_1$ a pulse of some duration is coming in. The signals $e$, $s_1$ and $s_2$ then assume the values 1, 0, 1 respectively. At the clock instant $t_1$ the flipflop $FF_1$ transmits its changed input signal to its output ($s_3$="0," $s_4$="1.") At the clock instant $t_2$ the flipflop $FF_2$ performs the same ($s_5$="0," $s_6$="1".) When the counting pulse terminates between the clock instants $t_3$ and $t_4$, $e$, $s_1$, $s_2$ assume the values "0," "1" and "0" respectively. At the clock instant $t_4$ the flipflop $FF_1$ transmits its varied input signal to its output ($s_3$="1," $s_4$="0," hence $a$="1"), and at the instant $t_5$ the flipflop $FF_2$ does the same ($s_5$="1," $s_6$="0," hence $a$="0".) The circuit has then returned to the rest position. It has therefore responded to the reception of the counting pulse by supplying one pulse of a defined duration at its output.

The known device described above requires, however, a fairly great quantity of circuitry and the invention has for its object to provide a device which can be constructed with less circuitry.

Figure 3:
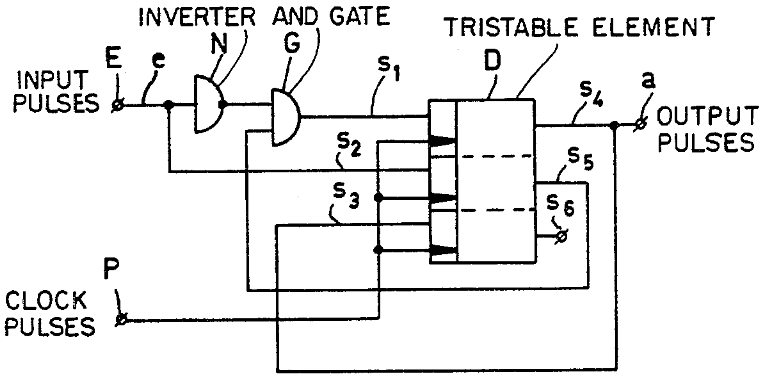
FIG. 3 shows the circuit diagram of a device according to the invention.

FIG. 3 shows the circuit diagram of a device according to the invention. Herein D designates a synchronous tristable circuit which is described in "The Proceedings of the Spring Joint Computer Conference," April 1964, vol. 25, page 471, FIG. 10. N is a negator or NON-gate, G an AND-gate, E an input terminal for receiving pulses and P an input terminal for clock pulses. The signals appearing in the device are designated by $e$, $s_1$, $s_2$, $s_3$, $s_4$, $s_5$, $s_6$, the output signal of the device by $a$.

The operation of the device will be obvious from the table of FIG. 4, which must be interpreted in a manner similar to that of FIG. 2. In the rest position of the device, i.e. when $e$="0," one has $s_1$="0," $s_2$="0," $s_3$="0," $s_4$="0," $s_5$="0," $s_6$="1." This state of the device is stable and the tristable circuit is in the position "1" ($s_4$="0," $s_5$="0," $s_6$="1"). Due to the reception of a pulse ($e$="1") the tristable circuit changes at the clock instant $t_1$ over to the state "2" ($s_4$="0," $s_5$="1," $s_6$="0") and this state of the device is also stable. In this state $s_1$="0," $s_2$="1," $s_3$="0," $s_4$="0," $s_5$="1," $s_6$="0." When the pulse terminates ($e$="0") between $t_3$ and $t_4$ the tristable circuit changes over to the state "3" ($s_4$="1," $s_5$="0," $s_6$="0"), but this state of the device is unstable due to the feedback, so that the device changes over at the next-following clock pulse instant ($t_5$) to the state in which the tristable circuit is in the state "1."

The signal $s_4$ is used as the output signal $a$, so that this has the value "1" only when the tristable circuit is in the state "3" ($s_4$="1," $s_5$="0," $s_6$="0"). Consequently, also this device responds to the reception of a pulse by supplying one output pulse of a defined duration.

What is claimed is:

1. A circuit for converting signal input pulses of any arbitrary duration, occurring at arbitrary instants into output pulses of constant duration occurring at instants determined by a clock means for generating a series of sequential pulses, comprising signal output means, a synchronous tristable element having three each of input, output and clock terminals, first means for coupling all of said clock terminals to said clock means, second means for coupling said signal input pulses to a first of said input terminals, third means for coupling a first of said output terminals to said signal output means, means for producing a change in state of said tristable element when a signal input pulse occurs and a double change in state when said input signal pulse ceases, thereby producing an output signal pulse of a selected duration, comprising feedback means for coupling at least two of said output terminals to at least two of said input terminals.

2. A circuit as claimed in claim 1 wherein said second coupling means comprises an inverter having an input connected to said input pulses, an AND gate having two inputs, one of said inputs being connected to the inverter output, and an output connected tto the first input terminal, a second of the input terminals being connected to said input pulses, and wherein said feedback means comprises a second of the output terminals being connected to the remaining AND gate input terminal, and the first output terminal being connected to the remaining input terminal.

References Cited

UNITED STATES PATENTS

| | | | |
|---|---|---|---|
| 3,188,484 | 6/1965 | Jorgensen | 328—63 XR |
| 3,225,301 | 12/1965 | McCann | 328—63 |

JOHN S. HEYMAN, Primary Examiner

JOHN ZAZWORSKY, Assistant Examiner

U.S. Cl. X.R.

307—265, 269; 328—58, 72, 164, 205